United States Patent [19]

Cooper

[11] Patent Number: 4,608,863
[45] Date of Patent: Sep. 2, 1986

[54] AIRCRAFT TAKEOFF AND ABORT INSTRUMENT

[76] Inventor: Marcus F. Cooper, 100, S. Interlachen, Apt. 501, Winter Park, Fla. 32789

[21] Appl. No.: 544,700

[22] Filed: Oct. 24, 1983

[51] Int. Cl.$^4$ .............................................. G01C 21/10
[52] U.S. Cl. .................................. 73/178 T; 73/515; 116/DIG. 43
[58] Field of Search ............. 73/515, 516 LM, 178 T; 116/DIG. 43, 62.1, 57, 56, 203, 212

[56] References Cited

U.S. PATENT DOCUMENTS

| | | | |
|---|---|---|---|
| 1,605,520 | 11/1926 | Dodge | 73/515 |
| 2,063,495 | 12/1936 | Elson | 73/515 |
| 2,134,092 | 10/1938 | Whipple | 73/515 |
| 3,048,329 | 8/1962 | Braaren | 73/178 T |
| 3,077,110 | 2/1963 | Gold | 73/178 T |

*Primary Examiner*—Donald O. Woodiel
*Attorney, Agent, or Firm*—Duckworth, Allen, Dyer & Pettis

[57] ABSTRACT

This Takeoff and Abort Instrument system, mounted on the pilot's instrument panel, will indicate to the pilot, as soon as the throttles are advance to the takeoff position and brakes are released if all engines are producing the designed takeoff thrust. During the takeoff run an ABORT indication will be visible to the pilot anytime the net aircraft linear acceleration degrades below that amount required to make a safe takeoff. This instrument assembly is comprised of two major components: A. A flexible transparent tube formed into a right triangle with the shortest leg being mounted vertically on the instrument face; this leg becomes a sight gauge up which a colored non-freezing liquid rises directly in proportion to the aircraft's linear acceleration. The longest leg connects the base of the sight gauge to a reservoir located forward of and level with the base of the sight gauge. The ratio of the height of the sight gauge to the distance between it and the reservoir is critical and is determined by the maximum thrust to Weight ratio for each category of aircraft. B. The face of the instrument has provisions for quickly adjusting the height of the TAKE-OFF and ABORT lines by the pilot to reposition them for changes in the obtainable linear acceleration due to variations in density altitude, takeoff weight, and runway slope.

15 Claims, 8 Drawing Figures

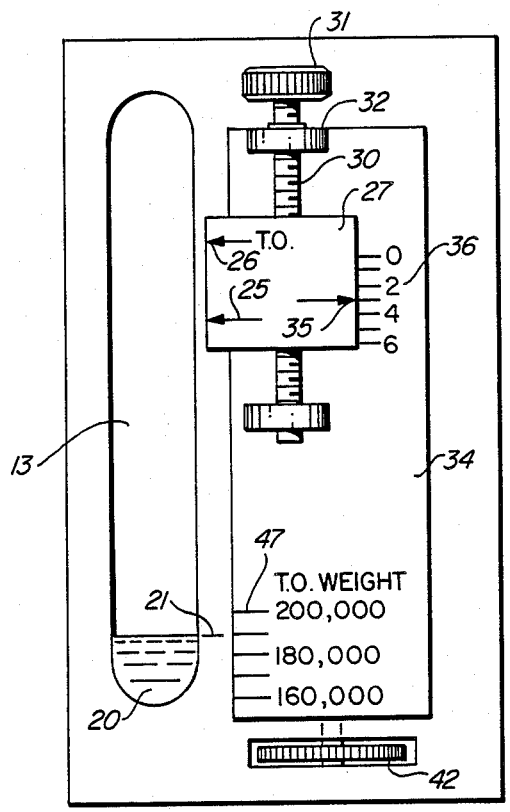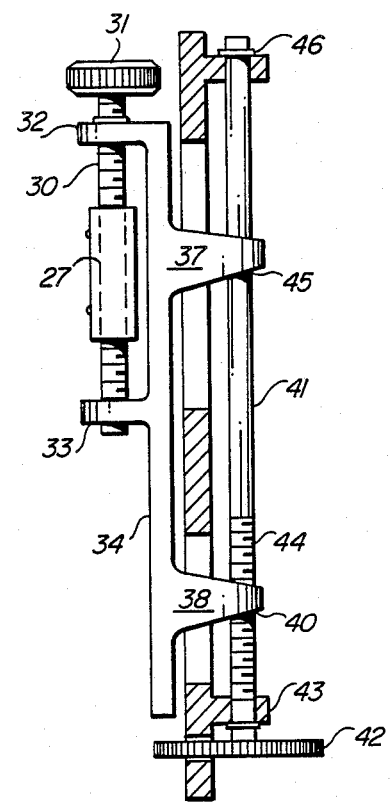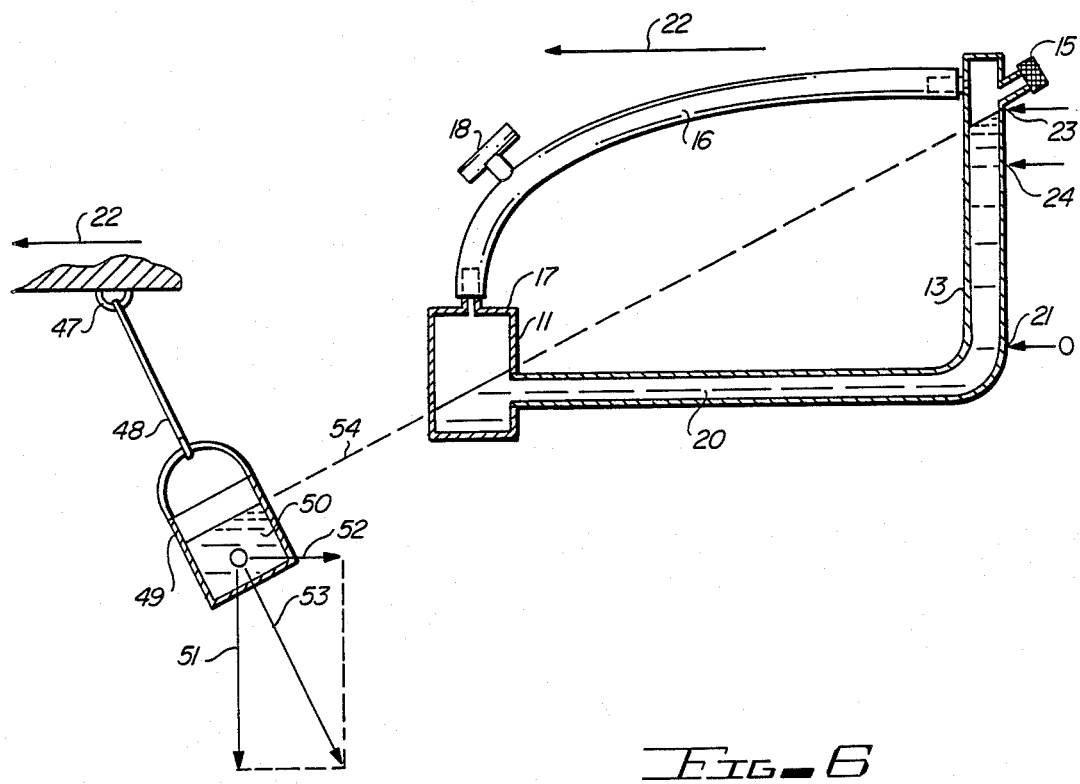

AIRCRAFT TAKEOFF AND ABORT INSTRUMENT

BACKGROUND OF THE INVENTION

The present invention is an Aircraft Takeoff and Abort Instrument utilizing a shifting liquid to indicate when the aircraft is achieving optimal linear acceleration during takeoff, or insufficient acceleration to make a safe takeoff.

A safe takeoff requires that the aircraft achieve adequate net thrust to produce proper acceleration. Many of the factors that reduce net thrust may not be noticed, or properly evaluated by the pilot. These include reduced engine thrust caused by malfunctions not shown by the engine instruments, increased drag caused by too much water or slush on the runway, flaps that have been lowered too far as a result of a malfunction or crew error, insufficient tire pressure, dragging brakes, or malfunctioning thrust reversers giving partial or full reverse thrust.

Should any of these things occur, the pilot may not realize that the aircraft is not accelerating properly, so he will continue the takeoff, fully expecting to accelerate to takeoff speed before running past a safe abort point, or out of runway. This is especially critical during conditions of poor visibility, which reduces the pilot's ability to judge his safe progress down the runway.

In view of these problems, various systems have been developed for automatically indicating whether and when to abort a takeoff. These systems typically rely on measuring either the air speed or the ground speed of the aircraft. If the speed is insufficient by the time the aircraft reaches the abort point for a particular set of conditions, the system activates a warning indicator.

Other systems for determining when to abort an aircraft during takeoff may be seen in U.S. Pat. No. 3,865,071 to Manor, which includes an electrical accelerometer interfaced to a display and uses a computer to compute various conditions of the takeoff. In the Hoekstra U.S. Pat. Nos. 2,922,982 and 3,174,710, an air speed indicator is coupled to a mechanically actuated indicator U.S. Pat. No. 4,284,029 to Roberts is for a takeoff safety indicator for aircraft having a double movement meter with crossover points to indicate takeoff conditions. U.S. Pat. No. 3,168,827 to Bailey uses a shifting mass connected to a linkage for driving a meter and includes adjustment for the aircraft load and the altitude of the runway, as well as for the temperature at the runway. U.S. Pat. No. 3,738,165 to Hanson shows an aircraft takeoff abort indicator which utilizes a shifting mass attached to a pendulum.

The present invention, on the other hand, is an aircraft takeoff and abort linear acceleration measuring instrument utilizing a shifting liquid in a closed tube that is dependent only upon the force of inertia for its proper function. Because of being completely self-contained, this instrument cannot be adversely affected by mechanical, electrical, or other influences that could reduce its reliability.

The laws of kinematics are consistant and repeatable. Therefore, if the instrument indicates that adequate acceleration of the aircraft has been up to the required amount during takeoff roll, then the pilot knows that the aircraft will attain takeoff speed in the shortest possible distance.

The operational use of this instrument is as follows:

As long as the liquid in the transparent tube stays above the ABORT index, continue the takeoff. If the top of the liquid moves below the ABORT index, abort the takeoff.

It should be clear at this point that an aircraft takeoff and abort linear acceleration measuring and indicating instrument has been provided which does not have moving parts that can malfunction, which is simple to build, which requires minimum maintenance, which is unbelievably reliable, easy to read and which occupies a minimum of space on the instrument panel.

It should be clear, however, that the present invention is not to be construed as limited to the forms shown, which are to be considered illustrative rather than restrictive.

SUMMARY OF THE INVENTION

The present invention is an aircraft linear acceleration measuring instrument whose purpose is to continuously indicate to the pilot the percent of the required acceleration the aircraft is achieving during the takeoff. It includes a closed tube system partially filled with liquid. The part of the system visible to the pilot is a transparent vertical tube up which the internal liquid rises in height directly in proportion to the increase in the aircraft linear acceleration.

Alongside this vertical tube may be placed a TAKEOFF index line to indicate the required acceleration needed for takeoff and an ABORT line which indicates a lower-than-required acceleration. This ABORT line is so placed that if the acceleration degrades to this line, or below, the pilot should immediately abort the takeoff.

The linear acceleration indicators for aircraft such as bombers and passenger jets whose takeoff weight varies significantly may have the above TAKEOFF and ABORT indices adjustable by the pilot to compensate for such weight variations and an adjustment to compensate for variations in airport altitude above sea level may be included. Also, an index line should be placed at the "at rest" or "zero acceleration" position. Its principle use will be as a pointer for setting the adjustable TAKEOFF and ABORT indice lines.

The configuration of the remainder of the system is not critical, except that there should be a small reservoir so located that the shifting liquid rises to the height of the TAKEOFF index line during the required takeoff acceleration, and during the "at rest" condition the top of the liquid level will be even with the ZERO (0) index line alongside the vertical tube. The top of the vertical transparent tube and the top of the reservoir must be connected with a tube to close the system. If this tube is sufficiently soft to accommodate the variations between pressure inside the system and the changes in cockpit pressure, a compensating diaphragm will not be needed as shown in the drawings.

BRIEF DESCRIPTION OF THE DRAWINGS

Other objects, features and advantages of the present invention will be apparent from the written description and the drawings, in which.

Figure 1:
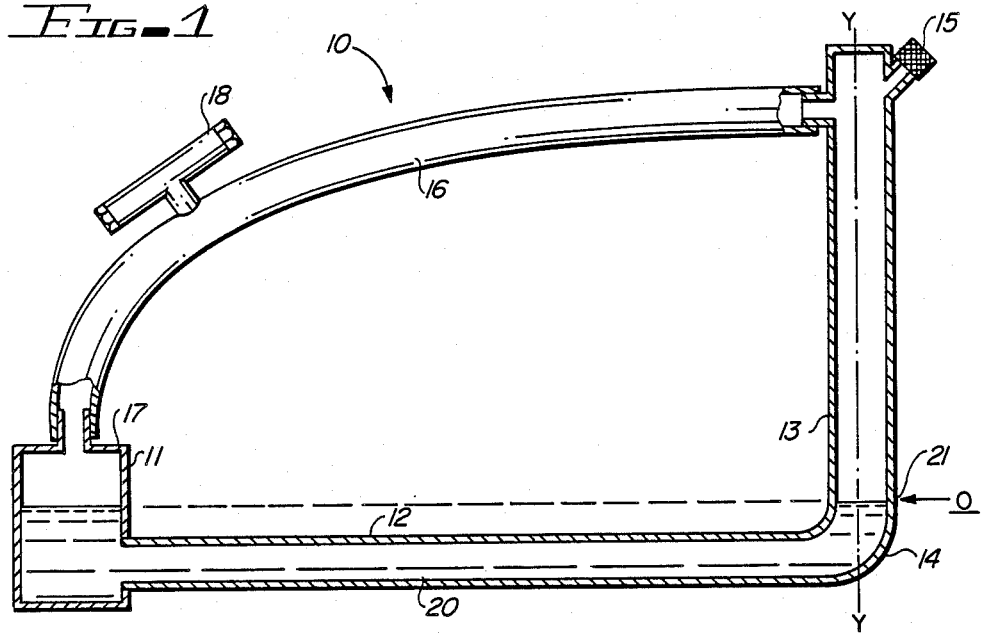
FIG. 1 shows a side elevation of the shifting liquid linear accelerometer in accordance with the present invention in the "at rest" condition.
Figure 2:
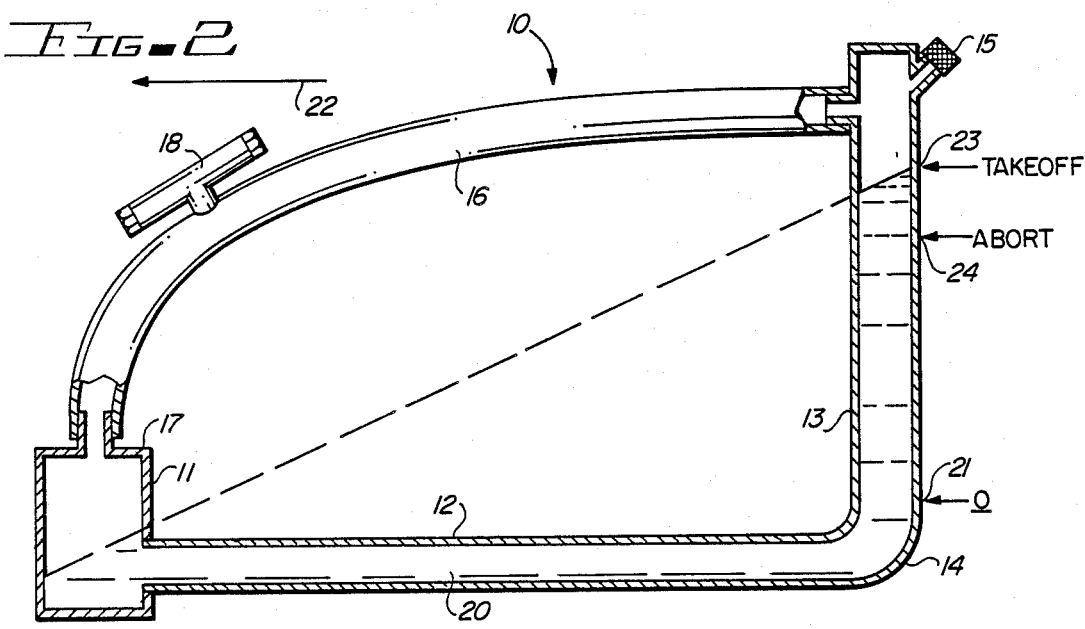
FIG. 2 is a side elevation of this indicating linear accelerometer in accordance with FIG. 1 in a normal takeoff condition.

FIG. 4 is a front elevation of an adjustable takeoff and abort scale in accordance with FIGS. 1 through 3, having altitude above sea level and takeoff weight adjustments, which are settable by the pilot to compensate for these variable conditions affecting accelerations;

FIG. 5 is a side elevation of the scale in accordance with FIG. 4; and

FIG. 6 illustrates the effect and force diagram, when a suspended bucket of liquid is subject to side acceleration. The plane of the top of the liquid is projected into the side elevation of the takeoff and abort instrument to illustrate what happens when this instrument is subjected to the same side acceleration.

DESCRIPTION OF THE PREFERRED EMBODIMENTS

The acceleration of a body varies directly with the thrust in accordance with the well known formula $F=MA$. This applies to an aircraft during takeoff where F=net thrust (engine thrust minus resistance forces); M=mass of the aircraft; and A=aircraft linear acceleration.

Since the gross weight of the aircraft is constant except for a negligible reduction in weight of the fuel consumed during takeoff, the mass can be essentially ignored in an indicating accelerometer of the type of the present invention. The thrust of jet engines remain nearly constant within the band of air speed associated with jet aircraft takeoff speed, with the thrust and acceleration varying directly. If less than the required takeoff thrust is obtained when the throttles are advanced for takeoff, then a corresponding loss of acceleration will occur. Conversely, if during the takeoff, the thrust declines or drag factors result in an unacceptable forward acceleration, then the aircraft does not obtain the takeoff speed and the pilot must immediately abort the takeoff. As the aircraft increases speed during takeoff, there will be a normal slight decrease in the acceleration caused by increasing aerodynamic drag. Should abnormal drag occur as a result of water or slush on the runway, or because of flat tires or tires having low pressure, or dragging brakes, or by the thrust reversers inadvertently shifting to reverse thrust or partially to reverse thrust, or if the takeoff flaps are too low as the result of a malfunction or pilot error, then the net thrust will be reduced, thereby reducing the acceleration of the aircraft. This should immediately cause the accelerometer to indicate a lower than normal acceleration (at or below the ABORT line) so that the pilot is advised to abort the takeoff. A warning light may be incorporated to alert the crew to this abort indication.

To improve the visibility of the shifting liquid in the instrument, ultraviolet back-lighting may be incorporated, which will cause the phosphorescent substance added to the liquid to phosphorece. Also a photo-electric cell, or other means, may be incorporated that will activate a warning light to light-up whenever the top of the shifting liquid drops below the "ABORT" line. A switch may be incorporated to turn on these circuits during the takeoff portion of the flight when they are needed.

FIGS. 1 and 2 show a Takeoff and Abort Instrument 10 in accordance with the present invention, having a liquid reservoir 11, a horizontal tube 12, a transparent vertical tube 13, connected to the horizontal tube 12 by an elbow 14. The top of the vertical tube 13 has a removable cap 15 to allow adjustments to the liquid volume in the closed tube system. A return tube 16 connects the top of the tube 13 to the top of the reservoir 17 and includes a flexible diaphragm 18 connected to the tube 16, which diaphragm can flex to compensate for changes in external pressure in the sealed liquid system caused by changes in the aircraft cockpit pressure. As seen in FIG. 1, the reservoir 11 and the horizontal tube 12 are partially filled with a liquid 20 to a zero point 21 on the vertical tube. As acceleration of an aircraft begins in the direction of arrow 22, the liquid 20 acts as a mass and its' inertia attempts to maintain its position as the aircraft accelerates, causing the liquid 20 to shift from the reservoir 11 through the horizontal tube 12 and up the vertical tube 13, as illustrated in FIG. 2. If sufficient acceleration is reached, the liquid will reach the TAKEOFF line 23. Under lower acceleration, the liquid will decline toward the abort line 24, or less, along the transparent vertical tube 13.

Figure 3A:
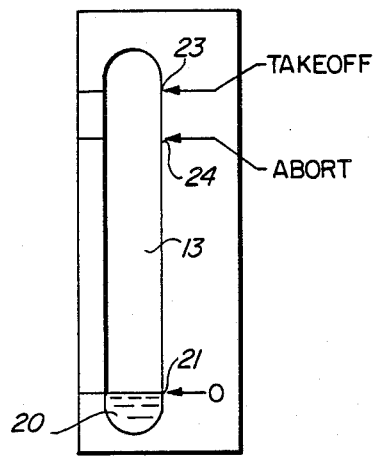
FIGS. 3A, 3B and 3C show a front elevation of a face plate for this accelerometer in accordance with FIGS. 1 and 2 in an "at rest" condition, "takeoff" condition and "abort" condition, respectively.
Figure 3B:
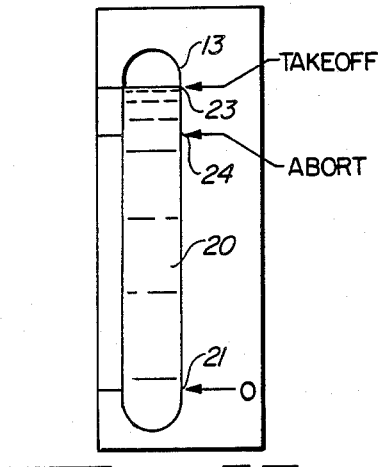
Figure 3C:
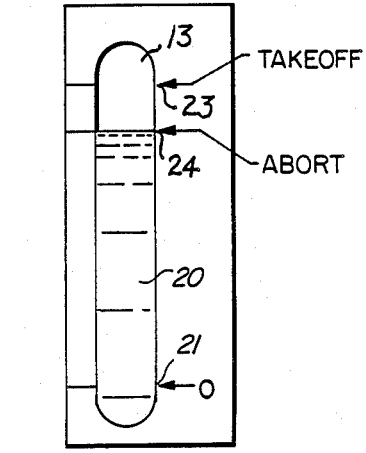

As shown in FIGS. 3A, 3B and 3C, the transparent vertical tube 13 would have a face plate alongside, marked to indicate ZERO point 21, the ABORT point 24 and the TAKEOFF point 23 for the liquid 20. FIG. 3A shows a liquid in a normal "at-rest" condition, while FIG. 3B shows the liquid in a normal takeoff condition, and FIG. 3C shows the liquid only reaching the abort condition 24.

The face plates of 3A, 3B and 3C have been modified in FIGS. 4 and 5 to allow adjustments to be made to compensate for variations in the airport altitudes above sea level, and for variations in the takeoff weight of the aircraft. An ABORT line 25 and a TAKEOFF line 26 are mounted to a movable plate 27, which has an internally threaded bore in the back thereof for movement whenever the external threads 30 are rotated by the handle 31 which rides in bosses 32 and 33 on a larger face plate 34. The plate 27 has a scale indicating arrow 35 which points at a scale 36 for adjusting the plate 27 and the ABORT line 25 along with the TAKEOFF line 26, in accordance with the field altitude, which is shown in FIG. 4 as being 3,000 feet above sea level. The plate 34 has a pair of support arms 37 and 38 with support arm 38 having an internal threaded bore 44 passing therethrough. A shaft 41 is rotated by rotating handle 42 riding in bearing support 43 to rotate the shaft 41 and the threads 44 to shift the gauge face plate 34 in accordance with the rotation of the handle 42. The arm 37 having a bore 45 can slide on the shaft 41 while the shaft can be supported by a bearing support 46 at the top end thereof. As shown in FIG. 4, the takeoff weight is indicated as 190,000 pounds in the Figure and this can be easily shifted to shift the plate 34 up or down to vary the position of the scale 47, which will simultaneously shift the gauge plate 27 and the ABORT point 25 and TAKEOFF point 26. Rotating the handle 31 will move the face plate 27 relative to the plate 34 to adjust the indicating arrow 35 to the scale 36 while shifting the ABORT line 25 and the TAKEOFF line 26.

In operation, the pilot is only required to set the field altitude by rotating the handle 31 to move the arrow 35 to the appropriate point on the scale 36 and to rotate the handle 42 to set the takeoff weight indicated on the scale 47 to the ZERO point 21 of the liquid 20. When applying takeoff power, if the liquid reaches the TAKEOFF point, the takeoff is continued, but if the liquid only reaches the ABORT point or below, the pilot should abort immediately.

FIG. 6 illustrates the forces acting on a liquid in a container when subjected to side acceleration. FIG. 6, has aircraft linear acceleration 22, the attachment point to the cockpit ceiling 47, cable 48 holding container 49 and liquid 50. The weight of the container and liquid is represented by vector 51, the inertia of the liquid mass during aircraft acceleration is represented by the vector 52, the resultant of forces 51 and 52 is represented by vector 53 and the plane of the surface of the liquid 54. Any liquid subjected to inertia 52 from the side will have the resultant 53 which is perpendicular to the plane of the surface of the liquid 54. This is true irrespective of the size and configuration of the container.

Therefore, this phenomenon can be translated into the shifting liquid of the current invention by extending the plane of the top of the liquid 54 in the left hand drawing of FIG. 6 into the right hand drawing of FIG. 6, which is the side view of the current invention.

I claim:

1. An Aircraft Takeoff and Abort Instrument comprising in combination:
   a closed tube system having at least one vertical tube having a transparent portion to visually expose liquid therein, said closed tube system being partially filled with a clearly visible liquid responsive to linear acceleration of the aircraft;
   adjustable indicating means to indicate the critical liquid positions in said vertical tube corresponding to aircraft ABORT and TAKEOFF; and
   an expansion diaphragm operatively connected to said closed-tube system to equalize variations in pressure.

2. An Aircraft Takeoff and Abort Instrument in accordance with claim 1, in which said closed-tube system includes a reservoir for holding liquid therein.

3. An Aircraft Takeoff and Abort Instrument in accordance with claim 2, in which said closed-tube system includes a tube connecting said reservoir to a vertically extending tube having a transparent portion thereof and a return tube connecting said vertical tube to said reservoir.

4. An Aircraft Takeoff and Abort Instrument in accordance with claim 3, which said closed-tube system has a filler cap for adjusting the liquid volume therein.

5. An Aircraft Takeoff and Abort Instrument in accordance with claim 4, wherein the indicating means includes a face plate mounted alongside said vertical tube and having ABORT and TAKEOFF indicating lines thereon.

6. An Aircraft Takeoff and Abort Instrument in accordance with claim 5, in which said face plate includes means for shifting said ABORT and TAKEOFF indicating lines along said vertically extending tube.

7. An Aircraft Takeoff and Abort Instrument in accordance with claim 6, in which said means for shifting said ABORT and TAKEOFF lines includes a gauge plate having the ABORT and TAKEOFF indicating lines thereon shiftable by the rotation of a threaded shaft to move said gauge plate along said vertical tube in accordance with the airport altitude above sea level.

8. An Aircraft Takeoff and Abort Instrument in accordance with claim 7, in which said gauge plate is attached to a threaded shaft mounted in bearings and has a rotating handle thereon.

9. An Aircraft Takeoff and Abort Instrument in accordance with claim 8, in which said gauge plate is mounted to a takeoff weight adjustment plate having means to move said takeoff weight adjustment plate to shift the gauge plate along said vertical tube.

10. An Aircraft Takeoff and Abort Instrument in accordance with claim 9, in which said takeoff weight adjustment plate is threadably attached to a partially threaded shaft, which shaft is rotatable to shift said TAKEOFF weight adjustment plate along said vertical tube.

11. An Aircraft Takeoff and Abort Instrument in accordance with claim 10, in which said takeoff weight adjustment plate has a weight scale thereon positionable by the rotation of said threaded shaft to position a predetermined weight to the ZERO line of liquid in said vertical tube.

12. An Aircraft Takeoff and Abort Instrument in accordance with claim 11, in which said takeoff weight adjustment plate is attached to a threaded shaft having a handle on one end thereof to rotate said shaft and said shaft is supported in a pair of bearing mounts.

13. An Aircraft Takeoff and Abort Instrument comprising in combination:
    a housing;
    a shifting liquid mass movably positioned in said housing responsive to linear acceleration of the aircraft;
    indication means on said housing to indicate the movement of said shifting liquid mass relative to said housing; and
    marking means on said indication means to indicate Abort and Takeoff points on said housing corresponding to shifted positions of the shifting liquid mass.

14. An Aircraft Takeoff and Abort Instrument in accordance with claim 13, in which said housing includes an airport altitude above sea level adjustement plate thereon movably mounted on a takeoff weight adjustment plate, which is in turn movably mounted to said housing, whereby adjustments can be made to said Aircraft Takeoff and Abort instrument for both airport altitude and the takeoff weight variations.

15. An Aircraft Takeoff and Abort Instrument in accordance with claim 14, in which said takeoff weight adjustment plate is positioned relative to an at rest indicia line or said housing.

* * * * *